United States Patent [19]

Harada et al.

[11] Patent Number: 5,644,554
[45] Date of Patent: Jul. 1, 1997

[54] MAGNETIC HEAD LOAD/UNLOAD DEVICE, METHOD AND A MAGNETO-OPTICAL DISK APPARATUS USING THE SAME

[75] Inventors: Kunio Harada, Hachioji; Toshimitsu Kaku, Sagamihara; Masuo Kasai, Hachioji; Masahiro Ojima, Tokyo, all of Japan

[73] Assignee: Hitachi, Ltd., Tokyo, Japan

[21] Appl. No.: 38,080

[22] Filed: Mar. 29, 1993

Related U.S. Application Data

[63] Continuation of Ser. No. 581,783, Sep. 13, 1990, abandoned, which is a continuation-in-part of Ser. No. 145,313, Jan. 19, 1988, Pat. No. 4,892,389, Ser. No. 153,094, Feb. 8, 1988, Pat. No. 5,020,041, Ser. No. 248,376, Sep. 23, 1988, Pat. No. 5,043,960, Ser. No. 501,545, Mar. 30, 1990, and Ser. No. 509,743, Apr. 17, 1990, which is a continuation-in-part of Ser. No. 153,094, said Ser. No. 501,545, is a continuation-in-part of Ser. No. 153,094.

[30] Foreign Application Priority Data

Sep. 18, 1989 [JP] Japan ................... 1-239992

[51] Int. Cl.⁶ ................................................ G11B 11/12
[52] U.S. Cl. ........................ 369/13; 360/114; 360/105
[58] Field of Search ....................... 369/13; 360/59, 360/114, 105, 75, 78.07, 109, 57; 365/122

[56] References Cited

U.S. PATENT DOCUMENTS

| | | | |
|---|---|---|---|
| 3,650,601 | 3/1972 | Buerlein | 365/122 |
| 3,715,740 | 2/1973 | Schmit | 360/114 |
| 3,731,290 | 5/1973 | Aagard | 360/114 |
| 4,204,235 | 5/1980 | Stollorz | 360/105 |
| 4,466,035 | 8/1984 | Connell | 369/13 |
| 4,528,607 | 7/1985 | Thompson | 360/105 |
| 4,562,105 | 12/1985 | Machida | 365/122 |
| 4,605,979 | 8/1986 | Inoue | 360/105 |
| 4,742,410 | 5/1988 | Smith | 360/105 |
| 4,752,848 | 6/1988 | Garcia | 360/105 |
| 4,888,750 | 12/1989 | Kryder | 369/13 |
| 4,926,408 | 5/1990 | Murakami | 369/13 |
| 4,956,243 | 9/1990 | Miyake | 369/13 |
| 4,959,821 | 9/1990 | Morimoto | 369/13 |
| 4,965,780 | 10/1990 | Lee | 369/13 |

OTHER PUBLICATIONS

Dickie, Young, *Recording Head Retraction Tool*, IBM Technical Disclosure Bulletin, vol. 19, No. 3, Aug. 1976.

*Primary Examiner*—Hoa T. Nguyen
*Attorney, Agent, or Firm*—Antonelli, Terry, Stout & Kraus, LLP

[57] ABSTRACT

A magnetic head is supported with variable stiffness for loading onto the disk surface and unloading off the disk surface. The magnetic head is attached to an end of a thin leaf spring which has been curved in advance, and the leaf spring is interposed between two flat plates, with one of the flat plates being slidable. With the slidable flat plate being moved to the position where the plate overlies a fitting section of the magnetic head, a head support point is provided at a first position with respect to the magnetic head, the thin leaf spring takes an extending straightened state, and at the same time, the thin leaf spring, two flat plates, and magnetic head fitting section form a unitary member with a high stiffness for supporting the magnetic head thereby to load the magnetic head onto the disk surface. With the slidable plate being moved in the opposite direction so as to free the curved section of the thin leaf spring, a second head support point provided at a position further away from the magnetic head than the first position, and the magnetic head is supported flexibly with a lower stiffness by the thin leaf spring. Since the thin leaf spring curves in a free state at this moment, the magnetic head which is attached to the end of the leaf spring is unloaded off the disk surface as if it is whipped up.

21 Claims, 7 Drawing Sheets

F I G. 3A
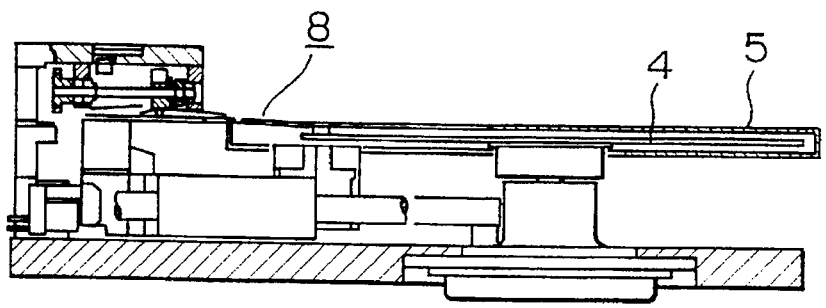
F I G. 3B
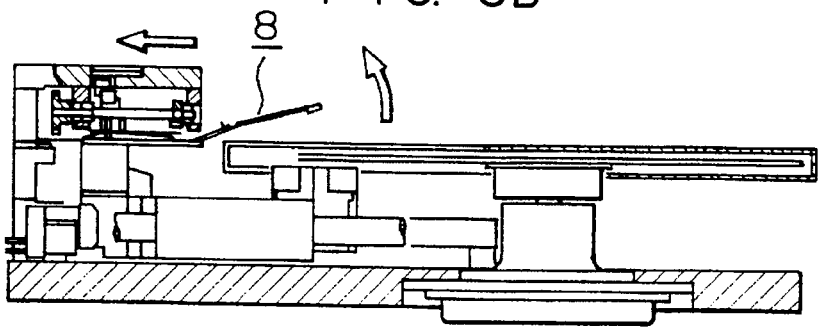
F I G. 3C
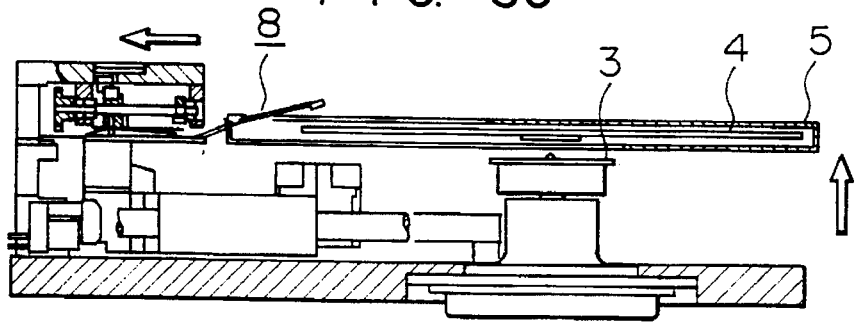
F I G. 3D
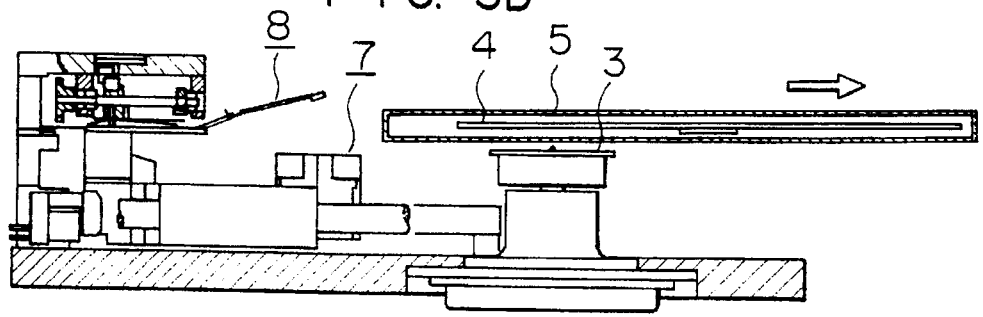

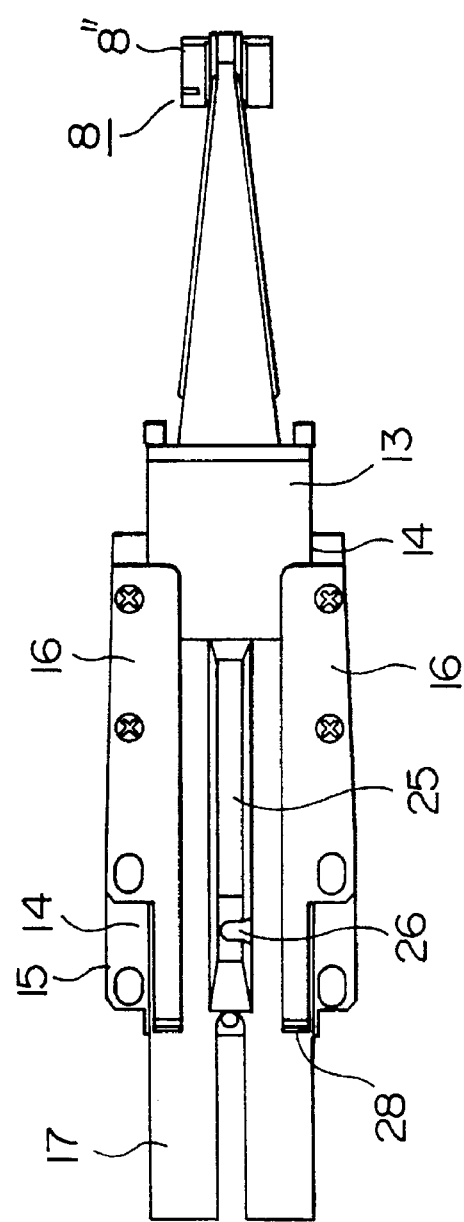
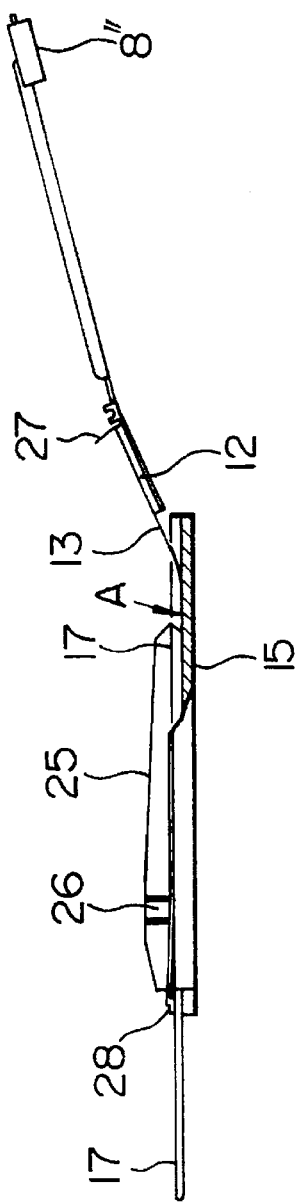
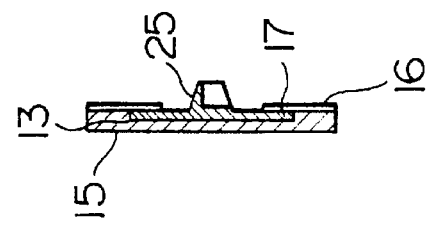
FIG. 4A
FIG. 4B
FIG. 4C

MAGNETIC HEAD LOAD/UNLOAD DEVICE, METHOD AND A MAGNETO-OPTICAL DISK APPARATUS USING THE SAME

CROSS-REFERENCES TO THE RELATED APPLICATIONS

This application is a continuation of application Ser. No. 07/581,783, filed Sep. 13, 1990, now abandoned which is a Continuation-in-Part application of applications U.S. Ser. No. 145,313 filed Jan. 19, 1988, now U.S. Pat. No. 4,892,389; U.S. Ser. No. 153,094 filed Feb. 8, 1988, now U.S. Pat. No. 5,020,041; U.S. Ser. No. 248,376 filed Sep. 23, 1988, now U.S. Pat. No. 5,043,960; U.S. Ser. No. 501,545 filed Mar. 30, 1990 which is a continuation-in-part of a application U.S. Ser. No. 153,094; and U.S. Ser. No. 509,743 filed Apr. 17, 1990 which is a continuation-in-part of a application U.S. Ser. No. 153,094. Those applications are assigned to the present assignee, the contents of which are incorporated herein by reference.

BACKGROUND OF THE INVENTION

This invention relates to a method and device for loading an unloading a magnetic head, and to a magneto-optical disk apparatus of information recording/reproduction apparatus (disk unit) such as a magnetic disk unit equipped with the head load/unload device.

In a disk unit, with its recording medium or magneto-optical disk unit, with its recording medium being exchangeable, it is necessary to move the magnetic head off the disk surface when the disk is changed. The device for this purpose is called "load/unload mechanism" for the magnetic head, and it is generally fitted on the arm which supports the magnetic head.

A conventional magnetic head load/unload mechanism of the case of a floppy disk unit will be explained. The floppy disk unit is equipped with a load/unload device of complex structure in which a magnetic head is mounted on a high stiffness arm and a head load/unload mechanism is mounted separately. This prior art device, however, does not consider the fast access operation of the head. The fast access operation of the head requires the reduction of the weight of moving parts, which also need to be stiff enough to withstand the high acceleration during the fast access operation. Light weight and high stiffness are conflicting factors in general. Because of the high stiffness arm for supporting the magnetic head, which is added by the head load/unload mechanism, it is difficult for the complex and heavy conventional magnetic head mechanism to achieve a lower weight and higher stiffness at the same time.

SUMMARY OF THE INVENTION

An object of this invention is to provide a magnetic head load/unload method which enables higher stiffness and lower weight of the load/unload mechanism which moves with the magnetic head thereby to accomplish the fast access operation.

Another object of this invention is to provide a magnetic head load/unload device which is simple in structure and yet has a high stiffness and lower weight for the fast access operation.

A further object of this invention is to provide a disk unit, e.g., information recording/reproduction apparatus such as a magneto-optical disk unit or magnetic disk unit, equipped with the above-mentioned head load/unload device.

In order to achieve the above objectives, the magnetic head support mechanism has its stiffness made variable for loading and unloading, as a feature of this invention. Specifically, the magnetic head is loaded to the disk surface with a stiffness of 5 kg/mm or more at the fitting section of the head and it is unloaded off the disk surface with a stiffness of 1 g/mm or less.

As another feature of this invention, the load/unload mechanism has a movable magnetic head support point. Specifically, at loading, i.e., during the access operation, the magnetic head support point is shifted toward the head so that the whole load/unload mechanism becomes a unitary high stiffness arm to support the magnetic head, while at unloading, i.e., when the disk is changed, the support point is shifted away from the magnetic head so that the magnetic head is supported by an elastic member and lifted in a whipping manner.

According to one aspect of this invention, the magnetic head is fitted at the end of a thin leaf spring which has been curved partly or entirely in advance, and the leaf spring is placed between two flat plates, with one flat plate being made slidable so that the leaf spring takes an extending straightened state or curving state by switching. With one flat plate being moved by sliding to the position where it overlies the fitting section of the magnetic head, the head support point is shifted toward the magnetic head and, at the same time, the thin leaf spring, two flat plates and the magnetic head fitting section form a unitary arm with high stiffness for supporting the magnetic head, and it loads the magnetic head onto the disk surface. With the flat plate being moved in the opposite direction so that the curved section of the leaf spring is freed, the head support point is shifted to the position which is distant from the magnetic head, and the magnetic head is supported flexibly by the thin leaf spring. In this transition, the thin leaf spring which curves in a free state acts on the magnetic head at the end of the spring to be unloaded off the disk surface as if it is whipped off the disk surface.

The thin leaf spring, with the magnetic head being fitted at its end, is curved partly or entirely in advance. When no external force is applied to the leaf spring in the normal state, it is in a state of curving, causing the magnetic head which is fitted at its end to be off the disk surface, i.e., unloaded state. When an external force is applied to the leaf spring by placing it between the two flat plates so that it extends straight, the magnetic head is loaded onto the disk surface. In this state, the magnetic head is fitted on a unitary stiff member made up of the two flat plates, leaf spring and fitting section of the head in combination. The load/unload mechanism serves also as a head support arm. The load/unload mechanism, which is in the separate state in the unloaded state, is converted into a unitary member to become a stiff magnetic head support arm. The inventive magnetic head load/unload device is compact and light weight.

As described above, the inventive device in its one form of practice, the thin leaf spring, two flat plates and magnetic head fitting section in combination form a unitary mechanism at loading, and it functions as a light-weight magnetic head support arm with a high stiffness of 5 kg/mm or more. Consequently, a magnetic head load/unload device which is durable against the high acceleration movement in the fast access operation is accomplished. In the unloaded state, the magnetic head is supported by the thin leaf spring with a very flexible stiffness of 1 g/mm or less, and it has little risk of damage even if it is hit by the cartridge or the like at unloading.

BRIEF DESCRIPTION OF THE DRAWINGS

These and other objects, features and advantages of the present invention will become more apparent from the following detailed description of a preferred embodiment taken in conjunction with the accompanying drawings, of which:

FIGS. 3A, 3B, 3C and 3D are diagrams showing sequentially the operation of such section during the exchange of the disk;

FIGS. 4A, 4B and 4C are detailed diagrams of the magnetic head load/unload mechanism, including a main projection view, front view and side cross-sectional view, with the magnetic head being unloaded;

DESCRIPTION OF THE PREFERRED EMBODIMENT

Figure 1:
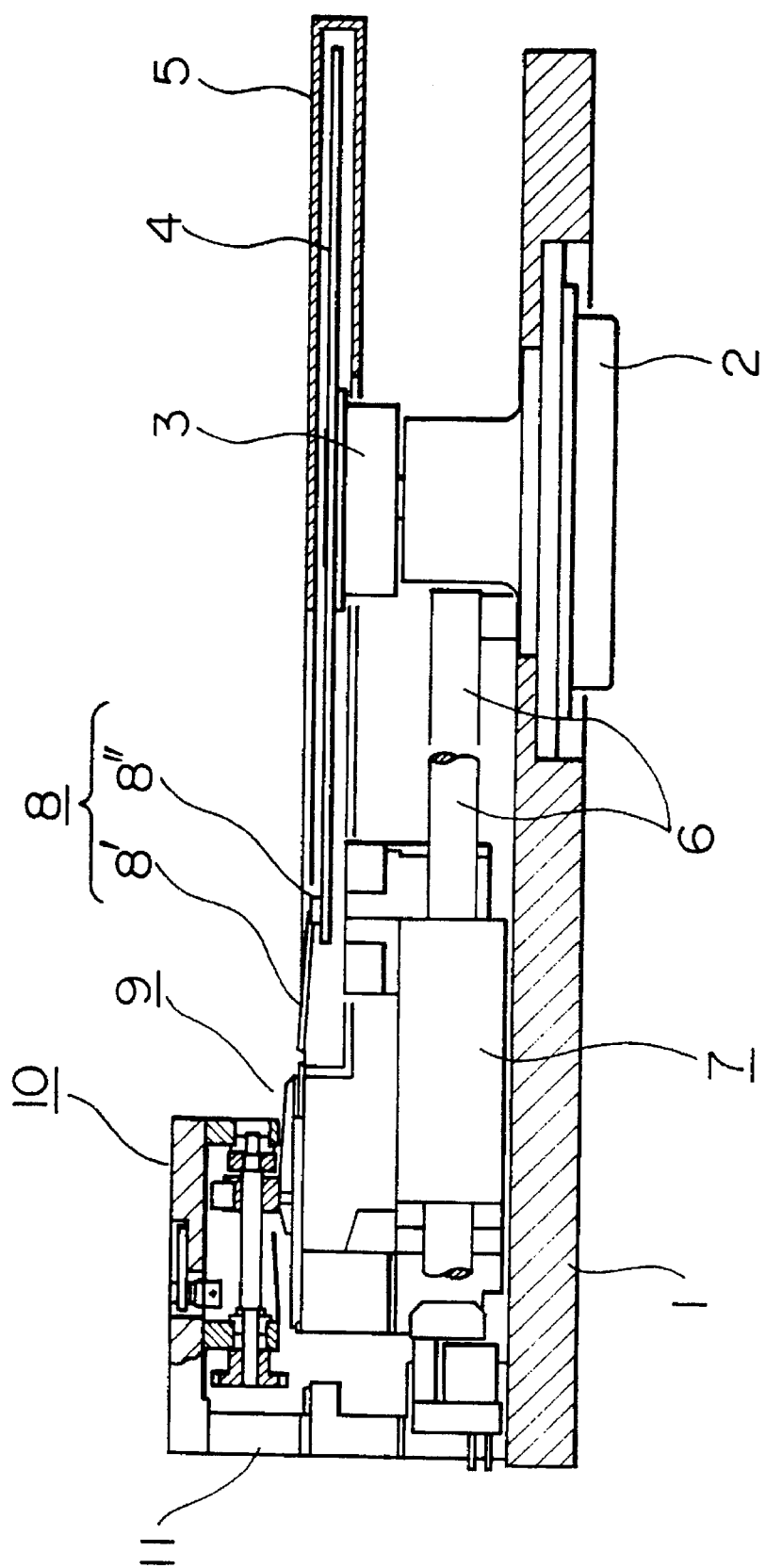
FIG. 1 is a cross-sectional view of the magneto-optical disk unit based on an embodiment of this invention.
Figure 2A:
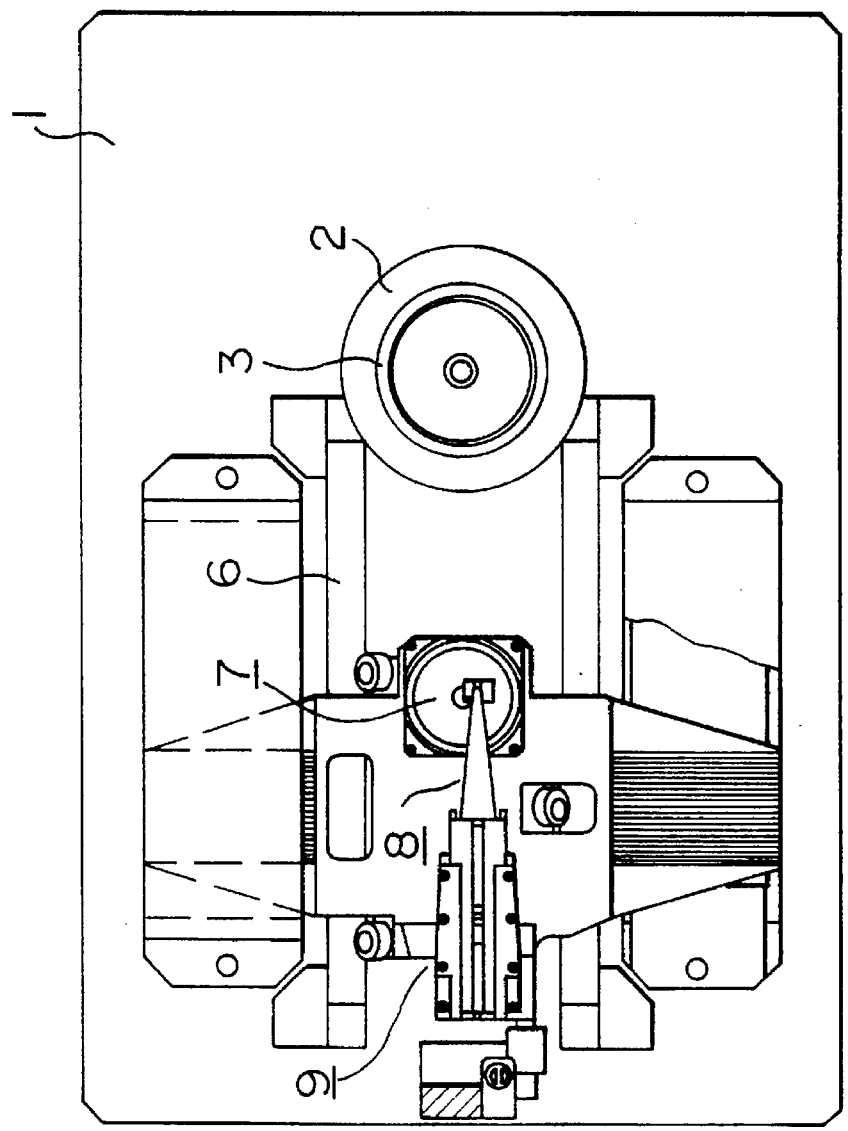
FIGS. 2A and 2B are plan view and side cross-sectional view of the disk unit seen by removing the driver of magnetic head load/unload mechanism, the disk and the cartridge from FIG. 1.
Figure 2B:
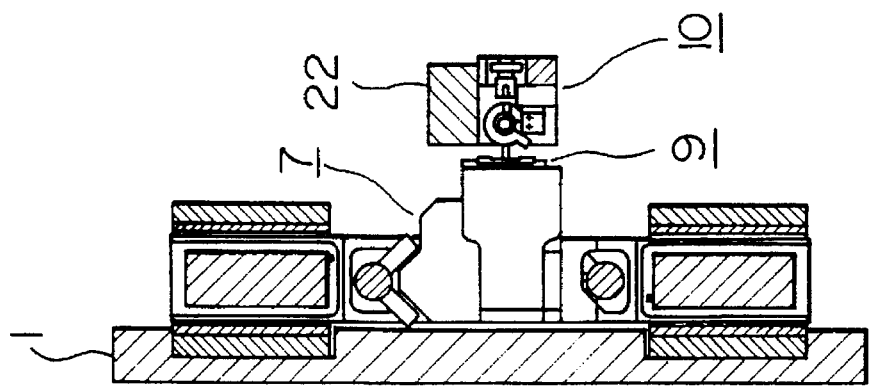

FIG. 1 is a diagram showing an embodiment of this invention, and it shows in brief the cross-sectional structure of the principal portions of the magneto-optical disk unit including an optical head, magnetic head, magneto-optical disk, spindle, and motor. FIGS. 2A and 2B show a plan view and side cross-sectional view of the structure seen by removing the driver of the magnetic head load/unload mechanism, disk and cartridge from FIG. 1.

Fixed on a base 1 is a spindle motor 2 which has a hub 3 for mounting rotatably a magneto-optical disk 4 as a data recording medium. The disk 4 is housed in a cartridge 5 and is normally operated inside the cartridge 5. Further fixed on the base 1 is a guide 6, and an optical head 7 and a magnetic head 8 (although the magnetic head is a core section embedded in the slider in general, components inclusive of a load arm 8' and slider 8" will be called the magnetic head 8 in this specification) are moved together in the radial direction of the disk 4 along the guide 6. The optical head 7 keeps a clearance of about 1 mm during the movement. The magnetic head 8 moves horizontally over the disk surface with a clearance of several hundred nm to several hundred μm as a result of the balance between the spring force of the load arm 8' which presses the slider 8" toward the disk surface and the gas dynamic pressure created by the rotation of the disk 4. The magnetic head 8 is mounted on the optical head 7 through a magnetic head load/unload mechanism 9 which serves as an arm for supporting the magnetic head. The magnetic head load/unload mechanism 9 has an associated driver 10 which is secured to the base 1 through a frame 11. Generally, data is recorded or reproduced in the loaded state shown in FIG. 1.

The following explains data recording and reproduction. The magneto-optical disk unit of this embodiment is an information recording apparatus based on over-writing which operates on a laser beam emitted from the optical head 7 and a magnetic field produced by the magnetic head 8 for information recording and erasure, and operates on a laser beam emitted from the optical head 7 for information retrieval. The magneto-optical recording, in which information is recorded and erased by using a laser beam and magnetic field, is designed to irradiate the recording film with a high-energy laser beam to heat a local portion of the recording film to the Curie temperature or above so that the irradiated area loses magnetization, and record polarized domains of magnetic field produced by the magnetic head 8 to the irradiated area. Recording modes fall into light power modulation recording in which the intensity of laser is modulated in response to the information to be recorded while applying a magnetic field continuously, and magnetic field modulation recording in which the polarity or magnitude of the magnetic field is varied in response to the information to be recorded while irradiating the medium with a laser beam continuously. The light power modulation recording mode records circular domains and the minimum domain length is restricted by the size of the focused laser spot, while the magnetic field modulation recording mode uses the laser beam only for heating the recording film and information recording is implemented by magnetic field switching on the magnetic head. The magnetic field modulation recording mode, which can record a domain smaller than the focused laser spot, is advantageous from the viewpoint of high density recording.

Information is retrieved based on the Kerr effect in which the polarization plane of the reflected beam from the magneto-optical disk rotates depending on the magnetization direction of recorded domain. The laser beam produced by the laser source has its intensity switched for recording and for retrieval, i.e., at information recording, a high energy laser beam is applied so that the irradiated area loses magnetization, and at information retrieval, a low energy laser beam is applied so that the irradiated area does not lose magnetization.

The optical head 7 is designed to project a laser beam onto the recording film on the magneto-optical disk 4 through the disk substrate, and it is made up of a laser source, an optical system for projection which focuses the laser beam from the laser source on the recording film, and an optical system for detection which receives the reflected beam from the recording film and produces an electrical signal. The detecting optical system includes an optical system for information signal detection which reproduces magnetized information and preformatted header information recorded on the magneto-optical disk 4, and an optical system for control signal detection which detects the out-focus signal and out-track signal. The intensity of the laser beam produced by the laser source is switched by a laser drive circuit.

On the other side of the magneto-optical disk 4, there is disposed a magnetic head 8, which applies a magnetic field, which carries information to be recorded, to the area of laser spot. The magnetic head 8 is an aerodynamic head which is kept afloat by the air pressure created between the head and disk by the rotation of the magneto-optical disk 4. The magnetic head 8 is coupled with the optical head 7 through a load/unload mechanism 9, and both heads moved together in the disk radial direction by a moving device, e.g., linear motor or stepping motor, as shown in FIG. 2B. The structure of the optical head 7 and magnetic head 8 is disclosed in U.S. patent application Ser. No. 07/153,094 or corresponding CIP application U.S. patent application Ser. No. 07/509,743, and it is hereby incorporated by reference. U.S. patent application Ser. No. 07/248,376 discloses the structure in which a laser beam from a laser source is split into a plurality of beams with a grating and the beams are focused by an optical system to form a plurality of laser spots on the recording film, information is recorded while erasing old information in overwrite manner through the application of a magnetic field, which is modulated in polarity or magnitude in response to information to be recorded, to the recording film with a magnetic head, and information is rendered error check on a real time basis. As a specific example, a laser beam from the laser source is split into three beams of 0 order, +1 order and −1 order, and these laser beams are focused by an optical system on the same track in such a manner that the third spot of the −1 order beam is made first, and next the second spot of the 0 order beam is made, and finally the first spot of the +1 order beam is made, for example. The second spot of 0 order beam having the highest intensity is used for recording and erasure at recording, and it is used for reading at reproduction. The second laser spot is also used for the out-focus detection and out-track detection. The first and third laser spots have a lower intensity than the second laser spot. At recording, the third spot which is ahead of the second spot reads the header signal such as the address, and the first spot which follows the second spot perform error check for recording. On this account, a detected signal derived from the first laser spot or a detected signal derived from the second laser spot is introduced selectively at recording or reproduction to a magneto-optical signal detection circuit.

The structure of the optical head 7 in FIG. 1 may be the one disclosed in the above-mentioned U.S. patent application Ser. No. 07/248,376, and it is hereby incorporated by reference. The slider 8" of the magnetic head 8 is not confined to that disclosed in U.S. patent application Ser. No. 07/153,094 or corresponding CIP application U.S. patent application Ser. No. 07/509,743, but it may be the structure having at least two slider rails, one of which being 2 mm or more in width, as disclosed in U.S. patent application Ser. No. 07/501,545, which is hereby incorporated by reference.

The mangneto-optical disk 4 includes a transparent disk substrate and a recording film formed on the substrate, and the disk surface is coated with a protection film when necessary. The recording film is formed of amorphous based on a rare earth element and a ferriferous element, e.g., TbFeCo. The structure of the magneto-optical disk 4 is disclosed also in the above-mentioned U.S. patent application Ser. No. 07/153,094, which is hereby incorporated by reference. The above-mentioned U.S. patent application Ser. No. 07/509,743 discloses that by using a multilayer structure made up of alternate lamination of metallic layers and dielectric layers to match the wavelength of laser beam, the magneto-optical effect is enhanced. This disclosure is hereby incorporated by reference. According to the U.S. patent application Ser. No. 07/509,743, the metallic layer includes a layer made of at least one material selected from Pt, Pd, Rh and Au, and a layer made of at least one material selected from Co and Fe. Alternatively, the metallic layer includes an alloy layer made of at least one material selected from Pt, Pd, Rh and Au, and at least one material selected from Co and Fe.

Following the explanation of the data recording/reproduction operation in the loaded state, the following explains the disk change operation with reference to FIGS. 3A to 3D.

In the case of taking out the disk 4, the cartridge 5, with the disk 4 being housed therein, is lifted about several millimeters and it is separated off the hub 3 as shown in FIG. 3A through FIG. 3C, and then the cartridge is moved and taken out in the direction opposite to the optical head 7 and magnetic head 8 (to the right in the figure) as shown in FIG. 3D. The cartridge 5 is moved along the guide (not shown) of the cartridge load/unload mechanism (not shown). The disk 4 is mounted by following the above procedure reversely. If the disk 4 is lifted in the state shown in FIG. 3A, the magnetic head 8 can be damaged. Therefore, it is necessary to lift the magnetic head 8 so that it is clear of the disk moving range, and this operation is implemented by the magnetic head load/unload mechanism 9. The following explains the operation of the magnetic head load/unload mechanism 9 based on this embodiment.

Figure 5A:
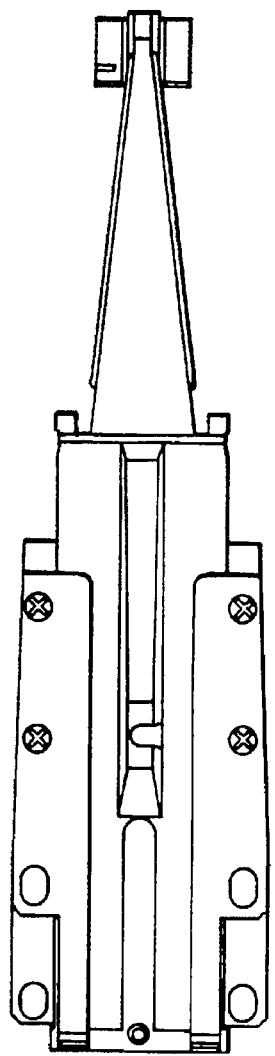
FIGS. 5A, 5B, 5C and 5D are detailed diagrams of the magnetic head load/unload mechanism, including a main projection view, front view and side cross-sectional view and fragmentary enlarged view, with the magnetic head being loaded.
Figure 5B:
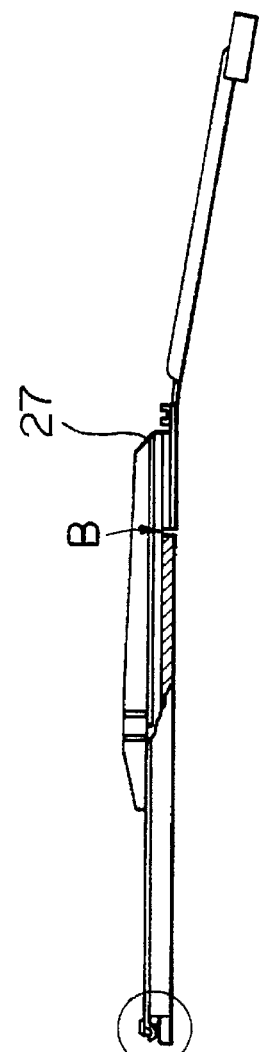
Figure 5C:

FIGS. 4A–4C and 5A–5D show the details of the magnetic head 8 and the magnetic head load/unload mechanism 9. The magnetic head 8 has a fitting section 12 of about 0.5 mm in width at the end opposite to the slider 8", and it is coupled with a thin leaf spring 13 which is curved partly or entirely in advance. The thin leaf spring 13 is fitted to a flat lower plate 15 having guide surfaces 14 on both sides thereof by being pressed to it by a flat upper plate 17 which is pushed downward by a pushing plate 16 and is movable along the guide surfaces 14. The thin leaf spring 13 is freed to curve as shown in FIGS. 4A–4C through the movement of the upper plate 17 away from the magnetic head 8, or it extends straight by being pushed as shown in FIGS. 5A and 5B through the movement of the upper plate 17 toward the magnetic head 8. In consequence, the magnetic head 8 fitted at the end of the thin leaf spring 13 goes up to have the unloaded state as shown in FIG. 4B, or it is pressed downward to have the loaded state as shown in FIG. 5B.

In the unloaded state of FIG. 4B, the upper plate 17, thin leaf spring 13, lower plate 15 and magnetic head fitting section 12 are in a disengaged state, causing the magnetic head 8 to be supported by the thin leaf spring 13 with a structural stiffness of 1 g/mm or less at the left end of the head fitting section 12. The magnetic head support point A in the unloaded state is located on the upper surface of the thin leaf spring 13 and proximate to the right end of the upper plate 17.

In the loaded state of FIGS. 5A and 5B, the upper plate 17, thin leaf spring 13, lower plate 15 and magnetic head fitting section 12 are engaged to form a unitary structure having a resulting stiffness of 5 kg/mm or more at the left end of the head fitting section 12. The magnetic head support point B in the loaded state is located proximate to the right end of the thin leaf spring 13 as shown in FIG. 5B. The thin leaf spring 13 with the magnetic head 8 being attached thereto curves by being freed through the movement of the upper plate 17, causing the magnetic head 8 to go up off the disk 4, and therefore this motion protects the magnetic head 8 and disk 4 in the event of an accidental disengagement of the upper plate 17 during the operation. In addition, the upper plate 17 presses the thin leaf spring 13 by overlying it up to the fitting section 12, minimizing vertical positioning error of the magnetic head 8 even if the upper plate 17 has a poor horizontal positioning accuracy, resulting in a constant contact force of the magnetic head 8 to the disk 4. Accordingly, the load/unload mechanism 9 of this embodiment is characterized in its variable stiffness and support point through the movement of the upper plate 17, which is implemented by the driver 10 in the magnetic head load/unload mechanism 9.

Figure 6:
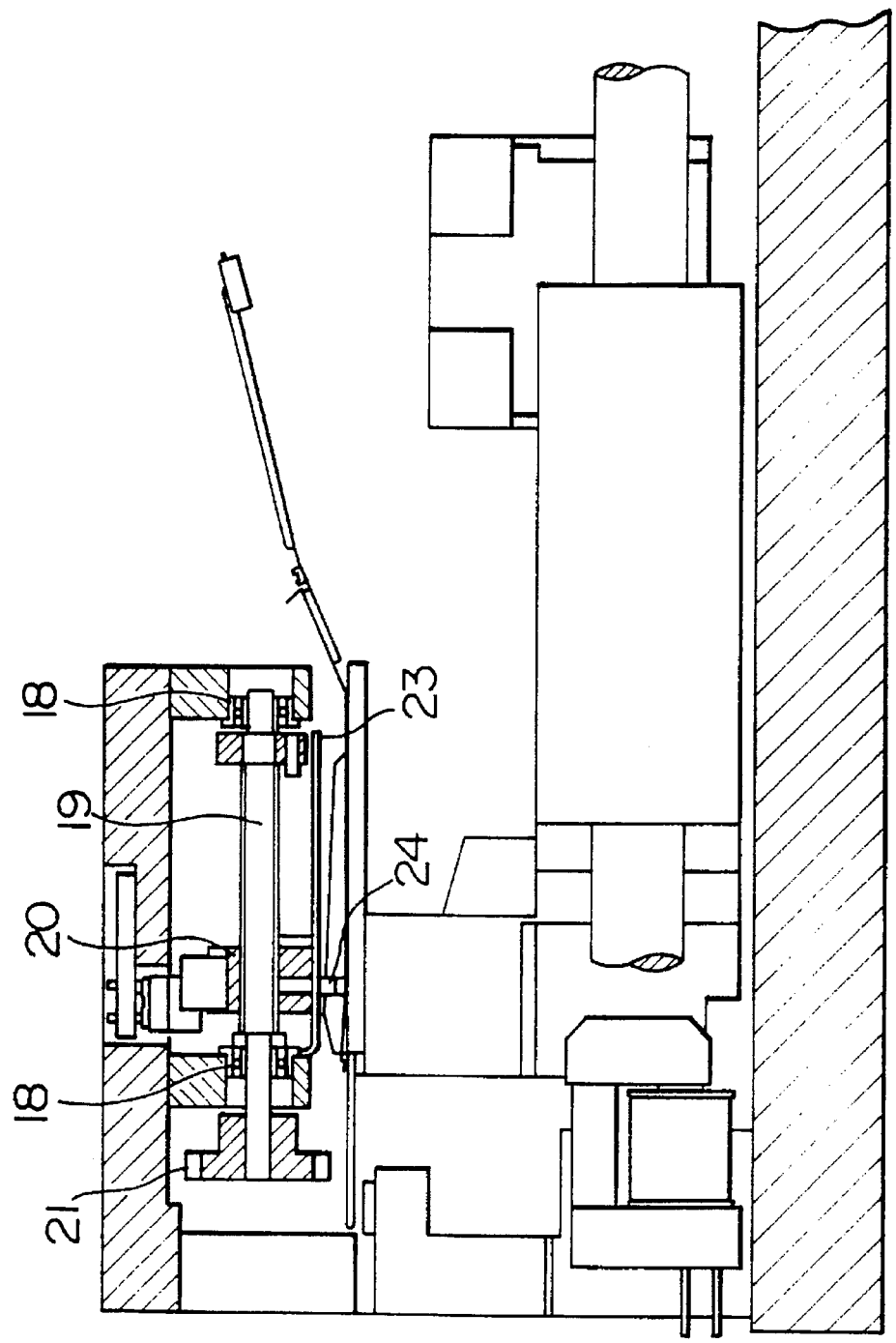
FIG. 6 is a detailed diagram of the driver of the magnetic head load/unload mechanism.

FIG. 6 shows the details of the driver 10 in the magnetic head load/unload mechanism 9. The driver 10 of the magnetic head load/unload mechanism 9 is a screw drive mechanism made up of a male screw 19 which is supported on its both ends by bearings 18, and a female screw 20. The male screw 19 rotates by being driven through a gear 21 by a drive motor 22 (not shown in FIG. 6 because of its location, but shown in FIGS. 2 and 7). In response to the rotation of the male screw 19, the female screw 20 moves along a spring guide pin 23, the role of which is to stop the rotation of the female screw 20. The female screw 20 has an attachment of a pin 24, which engages with a groove 26 formed in a rib 25 of the upper plate 17, so that it moves with the female screw 20. Accordingly, the motor 22 drives the upper plate 17 to move, and the magnetic head 8 is loaded or unloaded.

According to this embodiment, the drive force of the driver 10 which acts on the magnetic head load/unload mechanism 9 is not applied to the guide 6 and the bearing of the optical head 7, and therefore the guide 6 is not damaged and the positioning accuracy of the optical head 7 on the disk 4 is not deteriorated by the disk change operation.

Figure 7A:
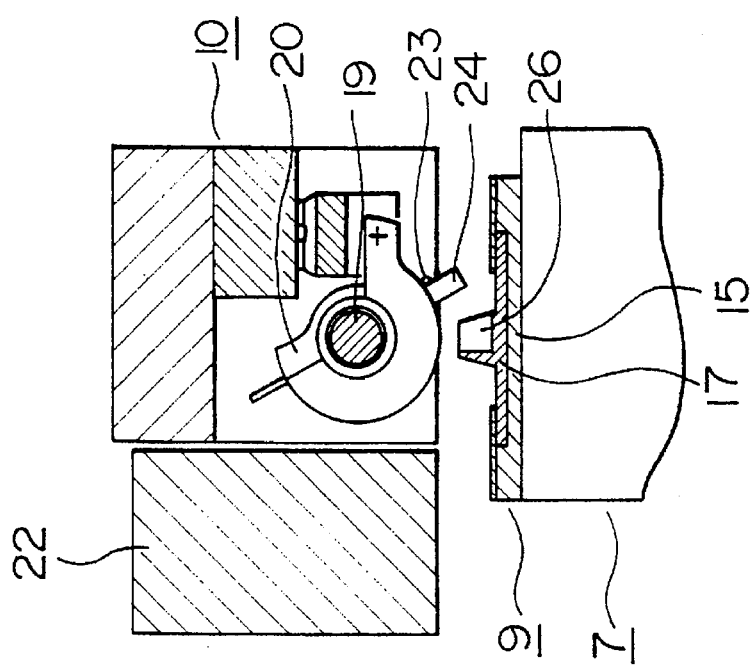
FIGS. 7A and 7B are longitudinal cross-sectional views of the driver of the magnetic head load/unload mechanism seen from the left side of FIG. 6, showing the states during loading and unloading and the state after the magnetic head has been loaded.
Figure 7B:
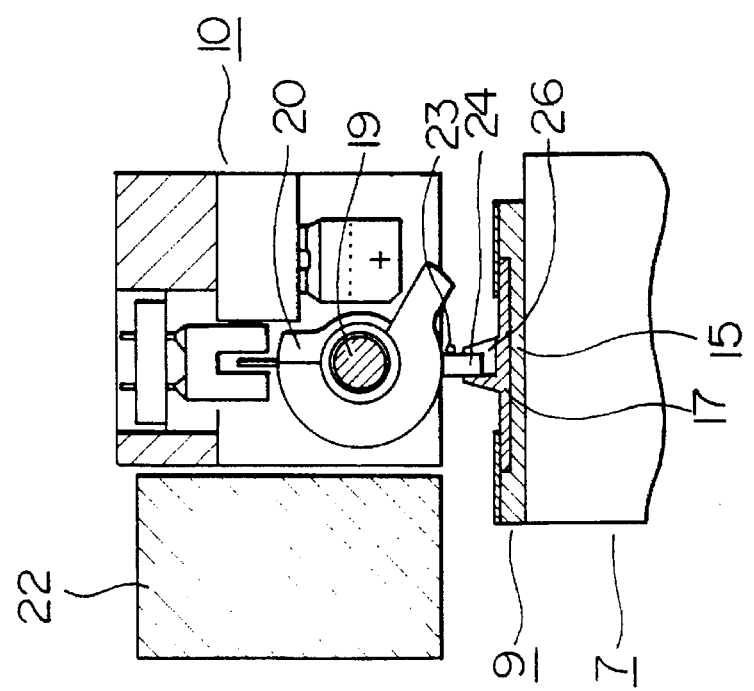

FIGS. 7A and 7B in cross-section the optical head 7, magnetic head load/unload mechanism 9 and associated driver 10 seen from the left side of FIG. 6.

Once the magnetic head 8 is loaded on the disk surface, the female screw 20 rotates against the spring force of the guide pin 23, resulting in the transition from the state of FIG. 7A to the state of FIG. 7B, and the pin 24 comes off the groove 26 formed in the rib 25 of the upper plate 17. Consequently, the optical head 7, magnetic head 8 and magnetic head 8 load/unload mechanism 9 are separated from the driver 10 of the load/unload mechanism 9, and the reduced weight of these components enables fast access for data recording and retrieval.

Figure 5D:
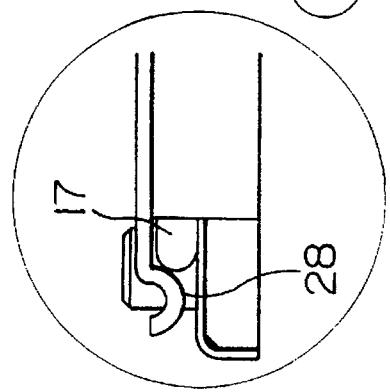

In order to prevent the displacement of the upper plate 17 from the lower plate 15 which is fixed to the optical head 7 during the fast access operation, there is provided a stopper 27 on the thin leaf spring 13 at its end nearer to the magnetic head so that the upper plate 17 does not go beyond the stopper 27. Similarly, a stopper 28, as shown in FIG. 5D which is an enlarged section of the encircled portion of FIG. 5B, is provided at the end of the pushing plate 16 so that the upper plate 17 is not displaced. At unloading, the upper plate 17 moves by lifting the stopper 28 provided on the pushing plate 16.

Through the operation of the foregoing magnetic head load/unload mechanism 9, the magnetic head 8 is cleared of the moving range of the disk when it is changed.

According to this embodiment, the magnetic head and the magnetic head load/unload mechanism form a unitary member as shown in FIG. 5B during the access operation (loaded state), providing high stiffness enough to withstand the fast access operation. And yet in the loaded state, the driver 10 is separated, and weight reduction is achieved. At disk change (unloaded state), the upper plate 17 which has shared the dedication of high stiffness retracts, leaving a flexible thin leaf spring, which whips up the magnetic head. As a result, loading and unloading of the magnetic head is made easier and the reduction of weight is promoted.

According to this embodiment, the magnetic head load/unload mechanism which also serves to support the magnetic head forms a unitary member during the fast access operation (loaded state) for data recording and retrieval, and this integration is dissolved at unloading when the disk is changed. In consequence, a load/unload device which varies in stiffness and magnetic head support point thereby to achieve the high stiffness and flexibility at the same time is realized, and eventually it enables the fast access operation backed by both reduced weight and high stiffness.

While preferred embodiments along with variations and modifications have been set forth disclosing the best mode and important details, further embodiments, variations and modifications are contemplated according to the broader aspects of the present invention, all as set forth in the spirit and scope of the following claims.

What is claimed is:

1. A magnetic head load and unload device for loading and unloading a magnetic head to and from a disk-shaped recording medium comprising:

a load and unload mechanism for loading and unloading said magnetic head, said load and unload mechanism including: a leaf spring which is curved in advance, a load arm supported on said leaf spring, said load arm having a magnetic head mounted thereon, a support mechanism selectable to a first position to unload said magnetic head from said disk-shaped recording medium by providing a first support point position on said leaf spring for supporting said magnetic head removed from said disk-shaped recording medium in an unloaded state and selectable to a second position to load said magnetic head onto said disk-shaped recording medium by providing a second support point position which is nearer to said magnetic head than said first support point position and shifted from said first support point position on said leaf spring for supporting said magnetic head adjacent to said disk-shaped recording medium in a loaded state; and a drive mechanism coupled to said load and unload mechanism for effecting selection of said support mechanism between said first and second positions on said leaf spring in an unload and load operation, respectively.

2. A magnetic head load and unload device according to claim 1, wherein said support mechanism includes two flat plates, with said leaf spring being interposed therebetween, one of said two flat plates being a movable flat plate so that said first and second support point positions are obtained by said drive mechanism moving said movable flat plate.

3. A magnetic head load and unload device according to claim 2, wherein said drive mechanism comprises a screw drive mechanism which moves said movable flat plate.

4. A magnetic head load and unload device according to claim 1, wherein said drive mechanism is operated to effect selection between said first and second positions with respect to said leaf spring to effect different arrangements of a combination of said support mechanism and said leaf spring so as to vary a stiffness of said load and unload mechanism, said magnetic head being loaded with a stiffness of at least 5 kg/mm and unloaded with a stiffness no greater than 1 g/mm.

5. A magnetic head load and unload device for loading and unloading a magnetic head to and from a disk-shaped recording medium comprising:

a load and unload mechanism for loading and unloading said magnetic head, said load and unload mechanism including: a leaf spring which is curved in advance, a load arm supported on said leaf spring, said load arm having a magnetic head mounted thereon, and two flat plates sandwiching said leaf spring therebetween, one of said two flat plates being a movable flat plate, a sliding mechanism for sliding said movable flat plate in a first direction toward said magnetic head for sandwiching said leaf spring between said two flat plates so that said curved leaf spring is at least partially straightened to load said magnetic head onto said disk-shaped recording medium and for sliding said movable flat plate in a second direction away from said magnetic head so that said leaf spring curves to unload said magnetic head off of said disk-shaped recording medium; and a drive mechanism coupled to said sliding mechanism for effecting a sliding of said movable flat plate in response to an unload and load operation.

6. A magnetic load and unload device according to claim 5, wherein said drive mechanism is operated to move said movable flat plate to effect different arrangements of a combination of said movable flat plate and said leaf spring so as to vary a stiffness of said load and unload mechanism, said magnetic head being loaded with a stiffness of at least 5 kg/mm and unloaded with a stiffness no greater than 1 g/mm.

7. A magnetic head load and unload device for loading and unloading a magnetic head to and from a disk surface comprising:

a leaf spring;
a load arm supported on said leaf spring;
a magnetic head attached at an end of said load arm; and
a drive mechanism selectable to support said leaf spring at first and second head support point positions on said leaf spring, said magnetic head being loaded onto the disk surface by said drive mechanism being selected to provide support at said first head support point position on said leaf spring and being unloaded from the disk surface by said drive mechanism being selected to provide support at said second support point position which is farther away from said magnetic head than said first support point position.

8. A magnetic head load and unload device according to claim 7 wherein said drive mechanism comprises two flat plates, with said leaf spring being interposed therebetween, one of said flat plates being movable so as to allow said drive mechanism to provide said support to said leaf spring at said first and second support point positions.

9. A magnetic head load and unload device comprising:

a load and unload mechanism adapted to move a magnetic head between a first region where said magnetic head is unloaded off of a disk surface and a second region where said magnetic head is loaded onto the disk surface, said load and unload mechanism including:
a leaf spring;
a load arm supported on said leaf spring;
a magnetic head mounted on said load arm; and
a load and unload selector selectable to move said magnetic head to said first region where said magnetic head is unloaded off of said disk surface by allowing said leaf spring to assume a normal curved and flexible posture and selectable to move said magnetic head to said second region where said magnetic head is loaded onto said disk surface by imparting said leaf spring with a loading stiffness which is greater than a stiffness of said leaf spring while said magnetic head is in said first region unloaded off of said disk surface; and
drive means for driving said load and unload selector in response to a load and unload operation.

10. A magnetic head load and unload device according to claim 9 wherein said load and unload selector comprises two flat plates with said leaf spring interposed therebetween, one of said flat plates being slidable so as to impart said loading stiffness to said leaf spring.

11. A magneto-optical disk apparatus comprising:

a motor for rotating said disk-shaped recording medium;
an optical head which projects a laser beam to said disk-shaped recording medium;
a magnetic head which applies a magnetic field to an area of said recording medium where said laser beam has been projected;
a load and unload mechanism which loads and unloads said magnetic head on said disk-shaped recording medium, said load and unload mechanism including:
a leaf spring which is curved in advance;
a load arm supported on said leaf spring;
a magnetic head mounted on said load arm;
a support mechanism selectable to a first position to unload said magnetic head from said disk-shaped recording medium by providing a head support point for supporting said magnetic head at a first position on said leaf spring and being selectable to a second position to load said magnetic head onto said disk-shaped recording medium by shifting the head support point to a second position on said leaf spring nearer to said magnetic head than said first position;

drive mechanism for effecting selection of the head support point between said first and second positions on said leaf spring in response to an unload and load operation; and a moving device which moves said magnetic head, said load and unload mechanism and said optical head in the form of a unitary member, with said magnetic head being coupled through said load and unload mechanism, in a radial direction of said disk-shaped recording medium.

12. A magneto-optical disk apparatus according to claim 11, wherein said optical head is disposed to confront said magnetic head.

13. A magneto-optical disk apparatus according to claim 11, wherein said support mechanism includes two flat plates with said leaf spring being interposed therebetween, one of said two flat plates being a movable plate so that said first and second positions are obtained by moving said movable flat plate by said drive mechanism.

14. A magneto-optical disk apparatus according to claim 13, wherein said drive mechanism comprises a screw drive mechanism which moves said movable flat plate.

15. A magneto-optical disk apparatus according to claim 11, wherein said drive mechanism is operated to select said support mechanism between said first and second positions on said leaf spring to effect different arrangements of a combination of said support mechanism and said leaf spring to vary a stiffness of said load and unload mechanism, said magnetic head being loaded with a stiffness of at least 5 kg/mm and unloaded with a stiffness no greater than 1 g/mm.

16. A magneto-optical disk apparatus comprising:

a motor for rotating a disk-shaped recording medium;
an optical head which projects a laser beam to said disk-shaped recording medium;
a magnetic head which applies a magnetic field to an area of said recording medium where said laser beam has been projected;
a load and unload mechanism which loads and unloads said magnetic head on said disk-shaped recording medium, said load and unload mechanism including;
a leaf spring which is curved in advance;
a load arm supported on said leaf spring;
a magnetic head mounted on said load arm; and
two flat plates with said leaf spring being interposed therebetween, one of said two flat plates being a movable plate, said load and unload mechanism further comprising a support mechanism being selectable to a first position to load said magnetic head by interposing said leaf spring between said two flat plates so that said curved leaf spring is at least partially straightened and being selectable to a second position to unload said magnetic head by moving said movable flat plate in a direction away from said magnetic head so that said leaf spring curves;

drive mechanism coupled to said support mechanism for moving said movable flat plate in response to a load and unload operation; and a moving device which moves said magnetic head, said load and unload mechanism and said optical head in the form of a unitary member, with said magnetic head being coupled through said load and unload mechanism, in a radial direction of said disk-shaped recording medium.

17. A magneto-optical disk apparatus according to claim 16, wherein said drive mechanism is operated to move said movable flat plate to effect different arrangements of a combination of said support mechanism and said leaf spring to vary a stiffness of said load and unload mechanism, said magnetic head being loaded with a stiffness of 5 kg/mm or more and being unloaded with a stiffness of 1 g/mm or less.

18. A magneto-optical disk apparatus according to claim 16, wherein said optical head comprises:

a recording head including an optical system for projecting a high-energy laser beam write spot to said disk shaped recording medium and recording domains along a track using a magnetic field, which has polarities in correspondence to information to be recorded, applied by said magnetic head; and a reproduction head including an optical system for projecting a low energy laser beam read spot derived from a laser beam having a wavelength of 600 nm or less to said disk-shaped recording medium, and a magneto-optical signal detection system which detects a displacement of a polarization plane of said read spot to read out recorded domains.

19. A magnetic head load and unload method using a leaf spring, a load arm supported on said leaf spring, a magnetic head attached on an end of said support arm, said method comprising the steps of unloading said magnetic head off of the disk surface by supporting said leaf spring at a first position which allows said leaf spring to assume a curved posture where said magnetic head is displaced from said disk surface and loading said magnetic head onto the disk surface by supporting said leaf spring at a second position nearer to said magnetic head than said first position, which causes said leaf spring to assume a straightened posture where said magnetic head is loaded near said disk surface.

20. A magnetic head load and unload method according to claim 19 further comprising the step of using two flat plates with said leaf spring being interposed therebetween, said supporting of said leaf spring at said first and second positions being obtained by sliding one of said two flat plates.

21. A magnetic head load and unload method comprising the steps of:

providing a leaf spring having one end supporting a load arm fitted with a magnetic head and another end interposed between two flat plates;

sliding one of said two flat plates in a direction toward said magnetic head to deform said leaf spring from a normal curved posture to a straightened posture to load said head onto a disk surface with a stiffness at a fitting section of said magnetic head of at least 5 kg/mm; and sliding said one flat plate in a direction away from said magnetic head to allow said leaf spring to return from a straightened posture to a curved posture to unload the magnetic head off of the disk surface with a stiffness no greater than 1 g/mm.

* * * * *